United States Patent
Bacher

(10) Patent No.: US 9,122,649 B2
(45) Date of Patent: Sep. 1, 2015

(54) HANDLING CROSS-PLATFORM SYSTEM CALL WITH SHARED PAGE CACHE IN HYBRID SYSTEM

(71) Applicant: International Business Machines Corporation, Armonk, NY (US)

(72) Inventor: Utz Bacher, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/048,114

(22) Filed: Oct. 8, 2013

(65) Prior Publication Data

US 2014/0040418 A1 Feb. 6, 2014

Related U.S. Application Data

(63) Continuation of application No. 12/342,704, filed on Dec. 23, 2008, now Pat. No. 8,621,207.

(51) Int. Cl.
G06F 15/173 (2006.01)
G06F 9/54 (2006.01)

(52) U.S. Cl.
CPC .......... *G06F 15/17331* (2013.01); *G06F 9/541* (2013.01); *G06F 9/545* (2013.01); *G06F 9/547* (2013.01)

(58) Field of Classification Search
CPC .. G06F 15/17331; G06F 9/5044; G06F 9/541
USPC ........... 713/164, 166; 709/216; 719/319, 330; 714/48
See application file for complete search history.

(56) References Cited

U.S. PATENT DOCUMENTS

| 7,003,593 | B2 | 2/2006 | Huppenthal et al. |
| 7,200,840 | B2 | 4/2007 | Gschwind et al. |
| 8,191,072 | B2 | 5/2012 | Bacher |
| 8,458,466 | B2 | 6/2013 | Bacher |
| 2004/0172629 | A1 | 9/2004 | Tene et al. |
| 2008/0005541 | A1* | 1/2008 | Hase et al. ............ 712/228 |
| 2010/0161978 | A1 | 6/2010 | Bacher |

OTHER PUBLICATIONS

Karimi, K.; Sharifi, M.; "Transparent Distributed Programming under Linux," High-Performance Computing in an Advanced Collaborative Environment, 2006. HPCS 2006. 20th International Symposium on, vol., no., pp. 13, May 14-17, 2006, (hereinafter, 'Karimi').*

Zhou, S.; Stumm, M.; Li, K.; Wortman, D.; , "Heterogeneous distributed shared memory," Parallel and Distributed Systems, IEEE Transactions on , vol. 3, No. 5, pp. 540-554, Sep. 1992.*

(Continued)

*Primary Examiner* — S. Ali Zaidi
(74) *Attorney, Agent, or Firm* — Schmeiser, Olsen & Watts

(57) ABSTRACT

A method and computing system for handling a page fault while executing a cross-platform system call with a shared page cache. A first kernel running in a first computer system receives a request for a faulted page associated with raw data from a second kernel running in a second computer system. In response to the request for the faulted page: (i) a first validity flag is updated to denote that the faulted page is unavailable to the first computer system in a first copy of the shared page cache and (ii) the faulted page is transmitted to the second kernel for insertion of the faulted page in a second copy of the shared page cache and for updating a second validity flag to denote that the faulted page is available to the second computer system in the second copy of the shared page cache.

18 Claims, 6 Drawing Sheets

(56) References Cited

OTHER PUBLICATIONS

Duzett, B.; Buck, R.; , "An overview of the nCUBE 3 supercomputer," Frontiers of Massively Parallel Computation, 1992., Fourth Symposium on the , vol., no., pp. 458-464, Oct. 19-21, 1992.*
Notice of Allowance (Mail Date Jan. 31, 2013) for U.S. Appl. No. 12/341,301, filed Dec. 22, 2008; Confirmation No. 1678.
x86 Linux Application Consolidation on Power Systems Platforms Using IBM Virtualization Technologies. IBM Corporation 2008. Whitepaper dated Jan. 29, 2008. 10 pages.
U.S. Appl. No. 121341,301, filed Dec. 22, 2008; Confirmation No. 1678, Customer No. 82116.
U.S. Appl. No. 12/341,342, filed Dec. 22, 2008; Confirmation No. 1743, Customer No. 82116.
Notice of Allowance (Mail Date Aug. 22, 2013) for U.S. Appl. No. 12/342,704, filed Dec. 23, 2008; Confirmation No. 3134.
312 Amendment (Filed Sep. 13, 2013) for U.S. Appl. No. 12/342,704, filed Dec. 23, 2008; Confirmation No. 3134.
RCE (Sep. 19, 2012) for U.S. Appl. No. 12/342,704, filed Dec. 23, 2008; Confirmation No. 3134.
Final Office Action (Mail Date Jun. 20, 2012) for U.S. Appl. No. 12/342,704, filed Dec. 23, 2008; Confirmation No. 3134.
Response (Filed Apr. 11, 2012) for U.S. Appl. No. 12/342,704, filed Dec. 23, 2008; Confirmation No. 3134.
Office Action (Mail Date Dec. 27, 2011) for U.S. Appl. No. 12/342,704, filed Dec. 23, 2008; Confirmation No. 3134.
Office Action (Mail date Mar. 26, 2014) for U.S. Appl. No. 13/856,499, filed Apr. 4, 2013, Conf. No. 3553.

* cited by examiner

HANDLING CROSS-PLATFORM SYSTEM CALL WITH SHARED PAGE CACHE IN HYBRID SYSTEM

This application is a continuation application claiming priority to Ser. No. 12/342,704, filed Dec. 23, 2008, now U.S. Pat. No. 8,621,207, issued Dec. 31, 2013.

CROSS REFERENCES TO RELATED INVENTIONS

This invention is related to U.S. patent application Ser. No. 12/341,301 entitled "SYSTEM AND METHOD FOR HANDLING CROSS-PLATFORM SYSTEM CALL IN A HYBRID SYSTEM", filed on Dec. 22, 2008, now U.S. Pat. No. 8,458,466, issued Jun. 4, 2013, and U.S. patent application Ser. No. 12/341,342 entitled "SYSTEM AND METHOD FOR SHIFTING WORKLOADS ACROSS PLATFORM IN A HYBRID SYSTEM", filed on Dec. 22, 2008, now U.S. Pat. No. 8,191,072, issued May 29, 2012.

FIELD OF THE INVENTION

The present invention discloses a system and associated method for efficiently combining high-end mainframe systems and lower-end server systems to provide stable and cost-effective computing environments.

BACKGROUND OF THE INVENTION

Mission-critical applications require stable and efficient computing environment. High-end mainframes are employed to stably host mission-critical applications. However, the high-end mainframes are prohibitively expensive to perform computation-intensive applications. Consequently, lower-end servers that primarily execute computation-intensive applications are often combined with high-end mainframes to provide both stability and cost-effective computation. However, issues regarding system integration, application migration, system management and administration must be solved to interconnect two types of platforms.

Thus, there is a need for a system and associated method that efficiently interconnect high-end mainframes and lower-end servers.

SUMMARY OF THE INVENTION

The present invention provides a method for handling a cross-platform system call with a shared page cache in a hybrid system, the method comprising:

receiving a request to execute the cross-platform system call from a user application running on a first computer system, wherein the cross-platform system call provides a kernel service upon being remotely executed on a second computer system of the hybrid system, the first computer system comprising the user application and a first kernel, the second computer system comprising a second kernel, and wherein the first kernel is coupled to the second kernel;

converting the cross-platform system call into a second configuration that is compatible with the second computer system such that the second kernel executes the converted cross-platform system call to provide the kernel service to the user application, wherein parameters of the cross-platform system call are converted upon determining that the parameters refer to raw data in the first computer system;

transferring the converted cross-platform system call to the second kernel;

handling a page fault that had occurred in the second kernel via transferring the corresponding page from the first kernel;

obtaining a result of executing the converted cross-platform system call, wherein the result is produced by the second kernel;

adjusting the obtained result to generate an adjusted result such that the adjusted result is in a first configuration that is compatible with the first computer system;

handling a page fault that had occurred in the first kernel via transferring the corresponding page from the second kernel; and sending the adjusted result to the user application that had sent the request, wherein said receiving, said converting, said updating, said transferring, said handling, said obtaining, said adjusting, and said sending are performed by the first kernel.

The present invention provides a computer program product, comprising a computer usable storage medium having a computer readable program code embodied therein, said computer readable program code containing instructions that when executed by a processor of a computer system implement a method for handling a cross-platform system call with a shared page cache in a hybrid system, the method comprising:

receiving a request to execute the cross-platform system call from a user application running on a first computer system, wherein the cross-platform system call provides a kernel service upon being remotely executed on a second computer system of the hybrid system, the first computer system comprising the user application and a first kernel, the second computer system comprising a second kernel, and wherein the first kernel is coupled to the second kernel;

converting the cross-platform system call into a second configuration that is compatible with the second computer system such that the second kernel executes the converted cross-platform system call to provide the kernel service to the user application, wherein parameters of the cross-platform system call are converted upon determining that the parameters refer to raw data in the first computer system;

transferring the converted cross-platform system call to the second kernel;

handling a page fault that had occurred in the second kernel via transferring the corresponding page from the first kernel;

obtaining a result of executing the converted cross-platform system call, wherein the result is produced by the second kernel;

adjusting the obtained result to generate an adjusted result such that the adjusted result is in a first configuration that is compatible with the first computer system;

handling a page fault that had occurred in the first kernel via transferring the corresponding page from the second kernel; and sending the adjusted result to the user application that had sent the request, wherein said receiving, said converting, said updating, said transferring, said handling, said obtaining, said adjusting, and said sending are performed by the first kernel.

The present invention provides a system comprising a processor and a computer readable memory unit coupled to the processor, said memory unit containing instructions that when executed by the processor implement a method for handling a cross-platform system call with a shared page cache in a hybrid system, the method comprising:

receiving a request to execute the cross-platform system call from a user application running on a first computer system, wherein the cross-platform system call provides a kernel service upon being remotely executed on a second computer system of the hybrid system, the first computer system comprising the user application and a first kernel, the second computer system comprising a second kernel, and wherein the first kernel is coupled to the second kernel;

converting the cross-platform system call into a second configuration that is compatible with the second computer system such that the second kernel executes the converted cross-platform system call to provide the kernel service to the user application, wherein parameters of the cross-platform system call are converted upon determining that the parameters refer to raw data in the first computer system;

transferring the converted cross-platform system call to the second kernel;

handling a page fault that had occurred in the second kernel via transferring the corresponding page from the first kernel;

obtaining a result of executing the converted cross-platform system call, wherein the result is produced by the second kernel;

adjusting the obtained result to generate an adjusted result such that the adjusted result is in a first configuration that is compatible with the first computer system;

handling a page fault that had occurred in the first kernel via transferring the corresponding page from the second kernel; and sending the adjusted result to the user application that had sent the request, wherein said receiving, said converting, said updating, said transferring, said handling, said obtaining, said adjusting, and said sending are performed by the first kernel.

The present invention provides a method and system that overcomes at least one of the current disadvantages of conventional method and system for providing kernel services in a hybrid system.

DETAILED DESCRIPTION OF THE INVENTION

Figure 1:
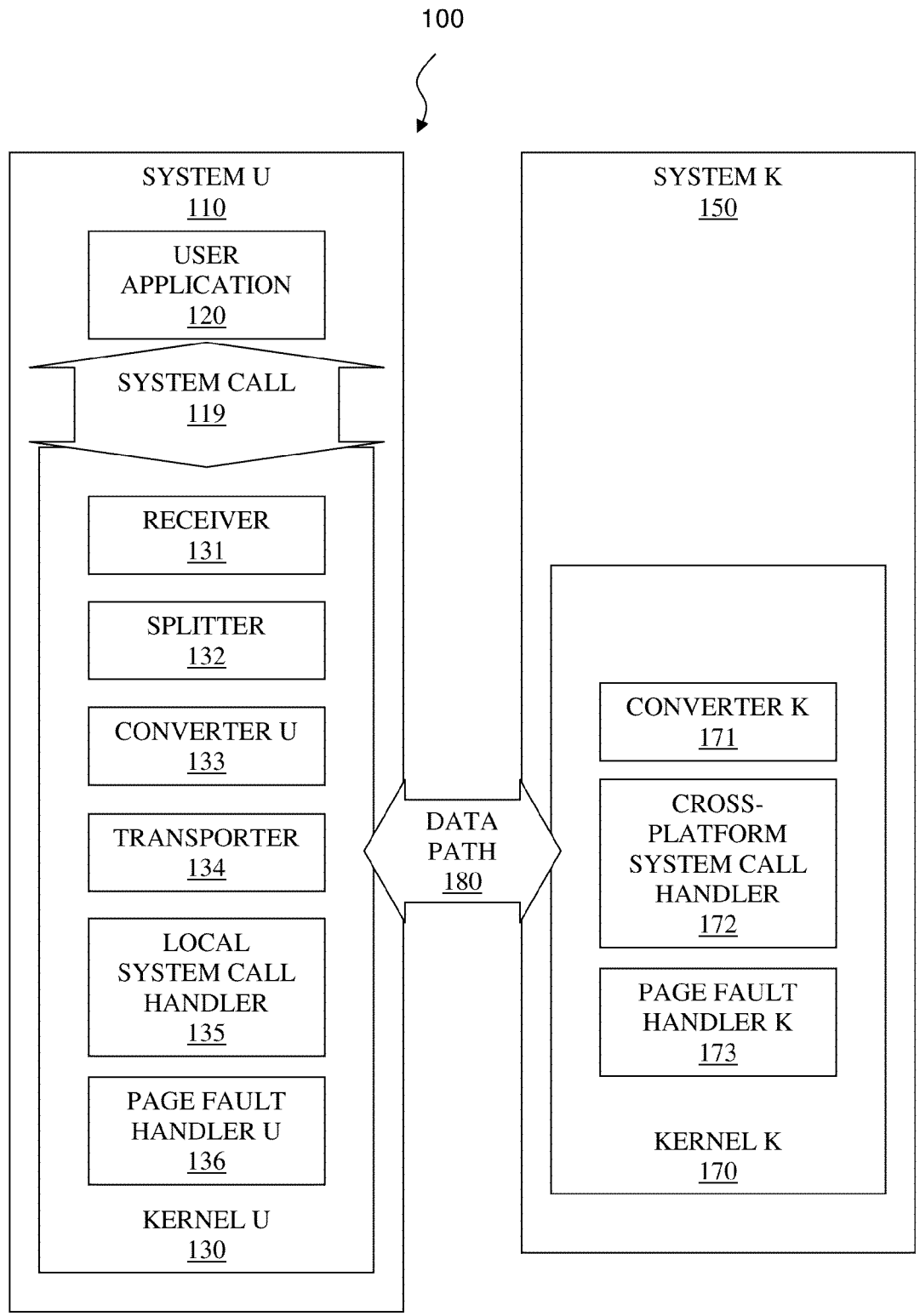
FIG. 1 illustrates a hybrid system that integrates two architecturally different systems respectively comprising kernels U and K at kernel levels, in accordance with embodiments of the present invention.

FIG. 1 illustrates a hybrid system 100 that integrates two architecturally different systems respectively comprising kernels U and K at kernel levels, in accordance with embodiments of the present invention.

The hybrid system 100 comprises at least one system U and a system K 150 interconnected through a data path 180. A system U 110 of said at least one system U is a lower-end server that is configured to primarily execute user applications that have intensive computation workloads in the hybrid system 100. The system K 150 is a high-end mainframe that is configured to primarily execute kernel services for the hybrid system 100. The system U 150 and the system K 150 operate on respective hardware platforms and have respective software environments that have convertible system calls for respective kernels. The system U 150 and the system K 150 communicate with each other through the data path 180 that interconnects their respective kernels. The hybrid system 100 is configured to be perceived by users as a single system that provides functionalities and characteristics of both the system U 110 and the system K 150.

The system U 110 is the lower-end server that is configured to primarily execute user applications for both the system U 110 and the system K 150 in the hybrid system 100. The system U 110 comprises at least one user application U and a kernel U 130.

A user application 120 of said at least one user application U is a user mode executable code of the system U 110. When the user application 120 needs a kernel service, the user application 120 invokes a system call U 119 to interfaces with the kernel U 110. The system call U 119 requests a service that is provided by the kernel U 130 and/or by the kernel K 170. Memory pages relevant to a cross-platform execution of the system call U 119 by the kernel K 170 are shared by both the system U 110 and the system K 150 as described in this specification.

The kernel U 130 is a main part of an operating system that controls the system U 110. The operating system provides services such as, inter alia, time/clock related services, memory management services, process management services including scheduling, termination, and signalling, data services such as file/file system operations, network operations, and I/O calls, debugging and logging functionalities, interprocess communication (IPC) services without a shared memory, memory sharing services, I/O synchronizations, system administration services, and hardware services, etc. Examples of the operating system may be, inter alia, Linux, UNIX®, etc. (UNIX is a registered trademark of X/Open Company Ltd., in the United States and other countries.)

The kernel U 130, among other operating system functionalities, specifically refers to a system call handling facility of the system U 110 throughout this specification. The kernel U 130 comprises a receiver 131, a splitter 132, a converter 133, a transporter 134, a local system call handler 135, and a page fault handler U 136, which are functional components rather than physically separated units.

The receiver 131 is an interface between the system call 119 invoked from the user application 120 and the kernel U 130. The system call 119 is serviced by the system U 110 and/or the system K 150. The receiver 131 sends the received system call 119 to the splitter 132.

The splitter 132 determines whether the received system call 119 is either a local system call of the system U 110 or a remote system call of the system K 150. The splitter 132 forwards the local system call to the local system call handler 135 and the remote system call to the converter 133.

In one embodiment of the present invention, examples of local system calls are, inter alia, a clock request system call of the user application 120 that does not need to be synchronized with the system K 150, a memory management system call such as mprotect( ) that modifies swapping properties of the user application, etc.

In the same embodiment of the present invention, examples of remote system calls are, inter alia, time related services, process/signal management services, file/file system operations, network operations, I/O devices accesses, debugging and logging functionalities, inter-process communication (IPC) services without a shared memory, a shared memory, etc.

The converter 133 converts the received remote system call to a corresponding system K system call that is executable on the system K 150. The converter 133 also converts a result of executing the corresponding system K system call returned from the system K 150 to a corresponding result for the system U 110 to provide the corresponding result to the user application 120. System calls of the system U 110 and system calls of the system K 150 are previously mapped according to their respective functionalities. Examples of issues to be addressed by the converter 133 may be, inter alia, a possible difference in endianness between the system U 110 and the system K 150, memory mappings, etc.

The transporter 134 sends the converted corresponding system K system call from the system U 110 to the system K 150. After the system call is executed on the system K 150, the transporter 134 receives a result of the converted corresponding system K system call from the system K 150.

The local system call handler 135 executes the local system call received from the splitter 132 and returns a result to the user application 120 that had invoked the system call.

The page fault handler U 136 manages a shared page cache of the system U 110 in concert with a page fault handler K 173 by loading a faulted page and updating a validity flag of an entry associated with a newly loaded page in the shared page cache of the system U 110. The term "page cache" defines a multiplicity of memory pages which is provided by an Operating System for kernel and application execution purposes. The shared page cache of the system U 110 is a page cache of the kernel U 130 for pages of the system U 110 that are shared with the kernel K 170. An entry representing a memory page in the shared page cache of the system U 110 has a respective validity flag indicating whether the memory page associated with the entry is available in the system U 110. See the description of FIG. 3B, infra, for details.

The system K 150 is, as noted, the high-end mainframe that is configured to primarily execute kernel services for both the system U 110 and the system K 150 in the hybrid system 100. The system K 150 comprises at least one user application K and a kernel K 170.

The kernel K 170 is a core of an operating system that controls the system K 150. 110. See the description of the kernel U 130, supra, for services provided by the operating system. The kernel K 170 comprises a converter K 171, a system call handler K 172, and a page fault handler K 173.

The system call handler K 172 receives a system call request from the transporter 134 of the system U 110 through the data path 180. The received system call request is serviced by the system call handler K 172. After executing the system call request, the system call handler K 172 returns a result to the transporter of the system U 110 through the data path 180. The system call handler K 172 controls an I/O device driver that handles an input/output (I/O) request that is directed to an I/O device that is controlled by the system K 150. In the hybrid system 100, the kernel K 170 services all I/O requests from both the system U 110 and the system K 150. Examples of the I/O device may be, inter alia, HiperSockets®, a direct access storage device (DASD), enterprise tape systems, etc. (HiperSockets is a registered trademark of International Business Machines Corporation in the United States and other countries.)

The page fault handler K 173 manages a shared page cache of the system K 150 in concert with a page fault handler U 136 by loading a faulted page and updating a validity flag of an entry associated with a newly loaded page in the shared page cache of the system K 150. See the description of the page fault handler U 136 for the definition of the term "page cache." The shared page cache of the system K 150 is a page cache of the kernel K 170 for pages of the system K 150 that are shared with the kernel U 130. An entry representing a memory page in the shared page cache of the system K 150 has a respective validity flag indicating whether the memory page associated with the entry is available in the system K 150. See the description of FIG. 3A, infra, for details.

The data path 180 interconnects the transporter 134 of the kernel U 130 and the system call handler 172 of the kernel K 170. The data path 180 directly connects the system U 110 and the system K 150 in a kernel level with a high-speed communication I/O device such as 10 Gigabit Ethernet.

In one embodiment of the present invention, the system U 110 is a blade server employing Intel® or AMD® processors and the system K 150 is an IBM® System z® mainframe. (Intel is a registered trademark of Intel Corporation in the United States and other countries; AMD is a registered trademark of Advanced Micro Devices, Inc in the United States and other countries; IBM and System z are registered trademarks of International Business Machines Corporation in the United States and other countries.) Both the blade server and the mainframe employ the Linux operating system or other UNIX family OS. The hybrid system 100 maintains input/output capability of the mainframe to HiperSockets, a direct access storage device (DASD), enterprise tape systems, etc. The hybrid system 100 retains superior hardware stability and management features of the mainframe. The hybrid system 100 also executes computation intensive applications on the blade server to achieve cost effectiveness. The hybrid system 100 provides a unified view of all resources for all applications on both the mainframe and the blade server.

The hybrid system 100 may be employed in areas of, inter alia, dynamic web servicing, data mining, SAP® R/3 application serving, Domino® groupware processing, application servicing and Java® processing. (SAP is a registered trademark of SAP AG in the United States and other countries; Domino is a registered trademark of International Business Machines Corporation in the United States and other countries; Java is a registered trademark of Sun Microsystems, Inc., in the United States and other countries.)

Figure 2A:
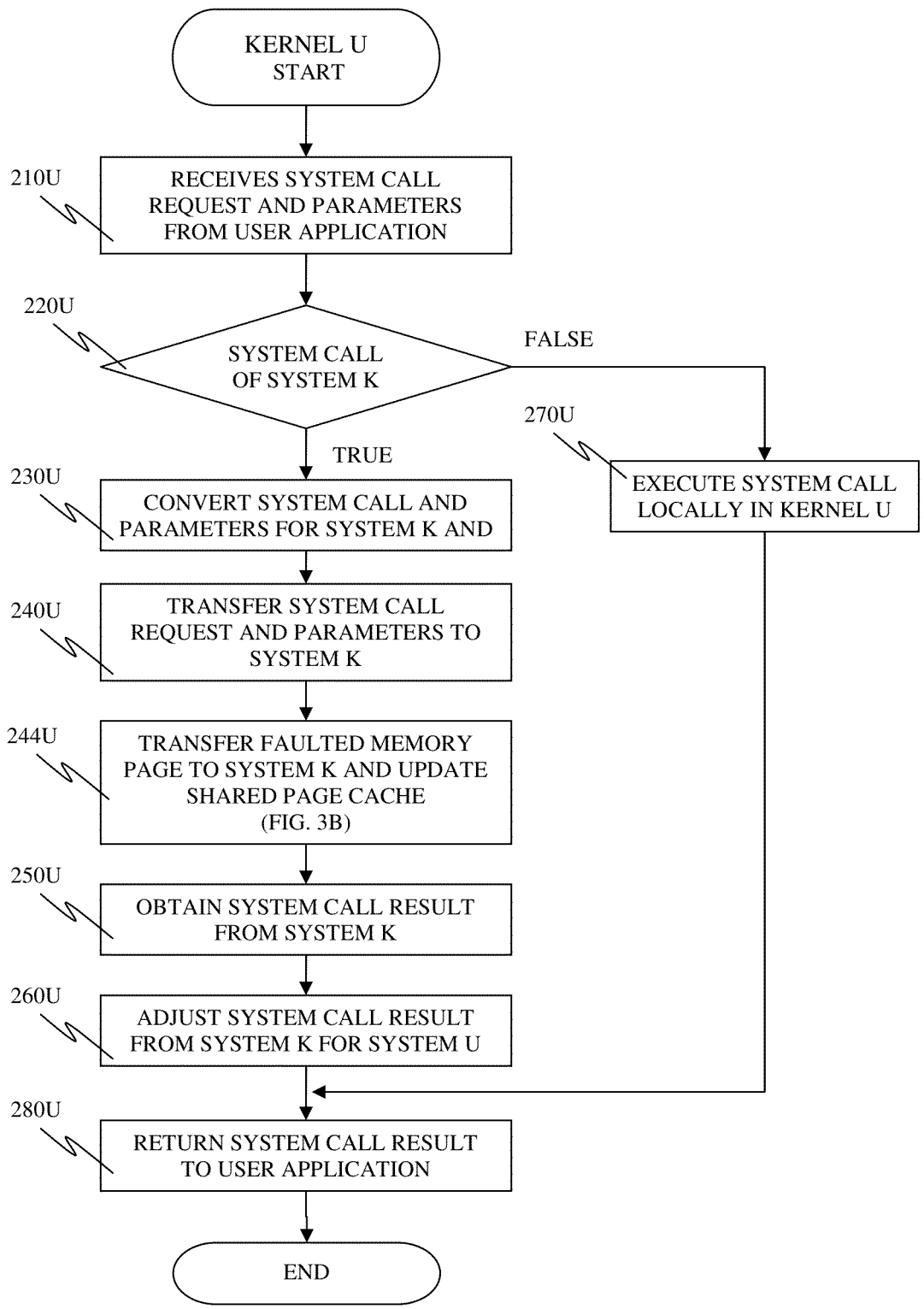
FIG. 2A is a flowchart depicting a method for handling a system call by the kernel U in the hybrid system of FIG. 1, in accordance with the embodiments of the present invention.

FIG. 2A is a flowchart depicting a method for handling a system call by the kernel U in the hybrid system of FIG. 1, supra, in accordance with the embodiments of the present invention.

Initially, the user application runs in a user mode on the system U. To perform a kernel operation, the user application invokes a system call to interface with the kernel U of the system U. Upon invoking the system call, the user application passes control over to the kernel U, and the system U starts running in a kernel mode to handle the system call.

In step 210U, the kernel U receives the system call request and parameters of the system call. The receiver of FIG. 1, supra, represents step 210U, which may be a separate subprocedure. The kernel U proceeds with step 220U.

In step 220U, the kernel U determines whether the system call should be executed remotely on the system K or whether the system call can be executed locally on the system U. If the kernel U determines that the system call can be executed remotely on the system K, then the system call handler of the kernel U proceeds with step 230U. If the kernel U determines that the system call can be executed locally on the system U, then the kernel U proceeds with step 270U.

In one embodiment of the present invention, the kernel U uses a predefined number scheme for each system call in determining whether the system call is remote or local in step 220U. Each system call and required parameters for each system call are analyzed and assigned a respective number describing a function of the system call. Examples of system call numbering based on the function of each system call may be, inter alia, {1=write, 2=read, 3=fork, 4=get-time-of-day, . . . }, etc. Based on the assigned number and necessary parameters of the system call, the kernel U determines whether to execute the system call either locally or remotely.

Whether a system call is either locally or remotely executed is determined based on, inter alia, concerns as to the overall effectiveness of the hybrid system, the seamless integration of the hybrid system, the utilization of each platform in the hybrid system, the workload distribution among platforms in the hybrid system, locality of resources that the system call is to operate on, etc.

There are certain system calls that require special/combined actions rather than simple remote/local execution. These actions are implementation specific and usually simulate the system call in a manner that provides services of the system call and satisfies system-specific requirements of both the kernel U and the kernel K. Examples of system calls require special actions may be, inter alia, I/O synchronizing system calls, exit( ) system call, administrative system calls, and hardware-specific system calls, etc. Examples of administrative system calls are, inter alia, reboot( ), kernel module handling calls, virtualization system calls, etc.

In cases of I/O synchronizing system calls such as sync( ), close( ), shared page cache handling through the page fault handler U and the page fault handler K will synchronize all dirty pages on both systems correctly.

In step 230U, the kernel U converts the system call and parameters associated with the system call into a corresponding system K system call and associated parameters for the converted corresponding system K system call, respectively. The kernel U proceeds with step 240U.

System calls and parameters are inherent to a platform and a kernel on which system calls are executed. Thus, to provide a consistent result in cross-platform system call execution, the kernel U system call and the parameters must be converted to the kernel K system call and corresponding system K data before an execution. System calls in respective systems are mapped by number and/or function. The parameters are converted with respect to differences between the systems, inter alia, endianness for numeric parameters, address space usage, pointers, namespace of object identifiers, memory object synchronization, etc.

When a parameter of the system call refers to a memory page consisting of raw data, conventional method converting the parameter from a system U configuration to a system K configuration is copying the raw data to the system K and converting the parameter to point the copied raw data. Example of the raw data may be, inter alia, content of I/O operations, etc. The conventional method copies all raw data back and forth between the system U and the system K, regardless of which pages are actually accessed by the system K kernel operations or applications on the system U which request kernel services. To optimize memory operations for a parameter referring to raw data areas, the system U and the system K shares a page cache comprising at least one entry that represents a respective memory page in both the system U and the system K. If an entry of the shared page cache in one system is valid, another entry of the shared page cache in the other system that represents the same page is invalid. An access to an invalid page results in a call to the page fault handler of a local system. The page fault handler of the local system and a page fault handler of a remote system that has a valid entry for the faulted page coordinate handling of the faulted page as described in FIGS. 3A and 3B, infra.

In one embodiment of the present invention, the kernel U converts only parameters that do not refer to memory areas but the kernel K converts such memory referring parameters for efficiency in the performance of the hybrid system as a whole.

In step 240U, the kernel U transfers the system call request including all parameters and data to the system K through the data path, without copying the raw data referred to by parameters. The system call request sent in step 240U is received by the kernel K in step 241K of FIG. 2B, infra. The kernel U proceeds with step 250U.

Figure 2B:
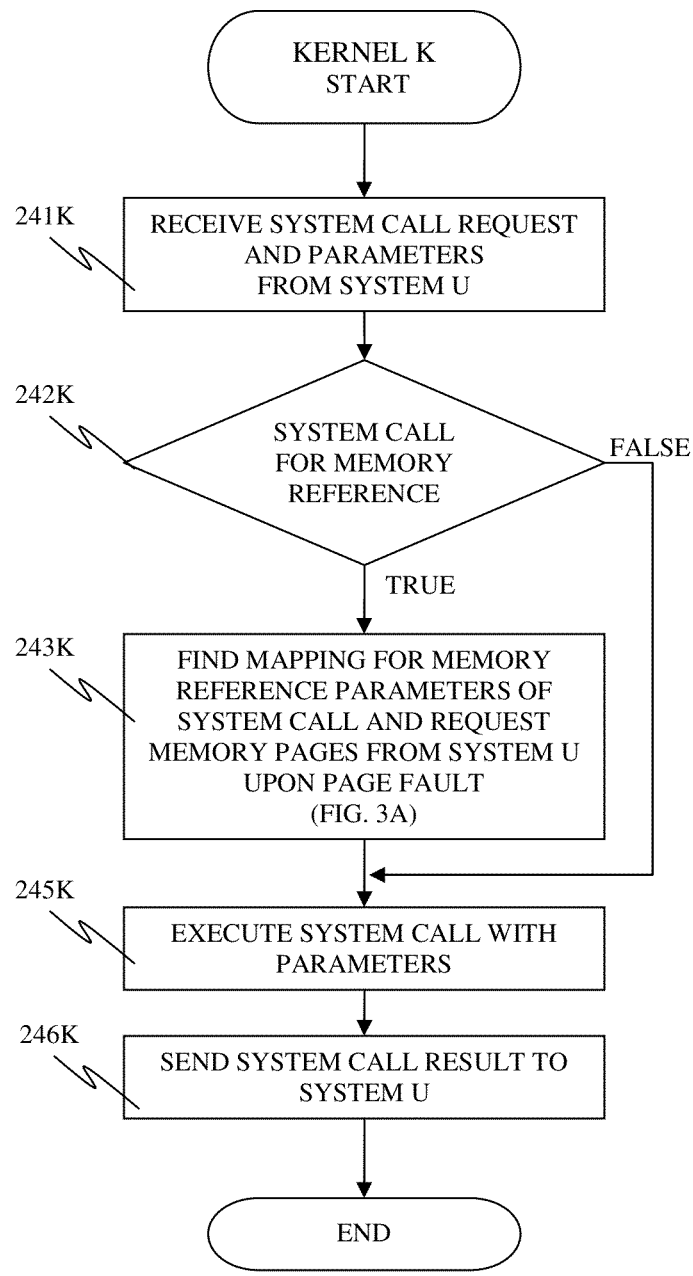
FIG. 2B is a flowchart depicting a method for handling a system call by the kernel K in the hybrid system of FIG. 1, in accordance with the embodiments of the present invention.

In step 244U, the kernel U receives a request to synchronize a faulted memory page with the kernel K in step 243K of FIG. 2B, infra. The kernel U transfers the faulted memory page to the kernel K and invalidates an entry in the shared page cache that is associated with the transferred memory page because the memory page in the kernel K is the only valid version of the memory page after the transfer.

In step 250U, the kernel U receives results from the kernel K performing step 246K of FIG. 2B, infra. The kernel U proceeds with step 260U.

In step 260U, the kernel U adjusts the result received in step 250U from the system K for the system U kernel and application. The adjustment in step 260U is a reverse process of the conversion in step 230U. Thus the adjustment in step 260U also comprises reverse conversions of data due to little/big endian differences, reverse conversions of data, pointers, raw data, and/or structured data to be configured for the system U, reverse translations of namespaces from the system K to the system U, etc. Because the result received in step 250U is executed on the system K, the result should be configured for the system U before the result is returned to the user application. If the system call has an impact on structures of the kernel U, the kernel U structure is updated in step 260U as a part of the adjustment. For example, if the system call is for signal or process management, a result of executing the system call changes processing environments of the system U in the kernel space and/or the user space. The kernel U proceeds with step 280U.

In step 270, the kernel U executes the system call locally on the system U as in a conventional single platform system consisting of the system U. The kernel U proceeds with step 280U.

In step 280, the kernel U returns the adjusted result from either step 260U or step 270U to the user application that had invoked the system call U. If any status updates resulting from executing the system call remotely on the system K need to be made available to the system U, the kernel U transmits such information regarding status updates to the system U prior to returning the control to the user application such that the user application on the system U obtains the result of the system service produced by executing the system call. The user application takes control of the thread of execution back from the kernel U and resumes the execution.

FIG. 2B is a flowchart depicting a method for handling a system call by the kernel K in the hybrid system of FIG. 1, supra, in accordance with the embodiments of the present invention.

In step 241K, the kernel K receives a system call request and parameters from the kernel U performing step 240U of FIG. 2A, supra.

In step 242K, the kernel K determines whether the requested system call needs memory reference to execute the requested system call. If the requested system call has parameters referring to a memory space, the kernel U marks the system call for a memory reference during the conversion in step 230U of FIG. 2A, supra. Thus the kernel K determines that the requested system call needs a memory reference pursuant to the information received from the kernel U. If the kernel K determines that the requested system call needs a memory reference, the kernel K proceeds with step 243K. If the kernel K determines that the requested system call does not need a memory reference, the kernel K proceeds with step 245K.

In step 243K, the kernel K finds a mapping associated with each memory reference parameter of the requested system call. When a page fault for each memory reference parameter occurs, the kernel K handles the page fault in concert with the kernel U as illustrated in descriptions of FIGS. 3A and 3B, infra, to copy raw data pointed to by each memory reference parameter that has triggered the page fault. Parameters that do not refer to memory spaces are already converted in the system U as illustrated in the description of step 230U of FIG. 2A, supra. The mappings associated with each memory pointer parameter point to respectively corresponding pages of the shared page cache of the system K, which is not valid until a page fault occurs in the system K for a mapped page in the system U. The kernel K uses the mapping associated with each memory reference parameter to locate parameters of the requested system call on the system K, even though the kernel K has not copied data pointed by each memory reference parameter.

For a system call having memory reference parameters, a memory area referred to by a parameter of the system call may be a structured object rather than raw data. For example, the ioctl( ) system call may have an object supporting a buffer interface. The structured object referred to by the parameter should be evaluated and converted element by element of the structured object pursuant to the usage of the parameter in the system call to execute the system call remotely on the system K. Each element of the structured object may be, inter alia, a numeric parameter, a memory reference with raw data, or a memory reference with a structured object. Any element of the structured object that is not a memory reference parameter is converted by the kernel U in step 230U prior to the system call is transferred. An element of the structured object that is a memory reference parameter is converted by the kernel K and pages referred to by the memory reference parameter are copied to the system K from the system U through page fault handling described in FIGS. 3A and 3B, infra. After performing step 243K, memory reference parameters point to respective valid pages in system K that correspond to respective pages in system U, which have been referenced by the system call on system U and have been copied from the system U. The kernel K proceeds to step 245K.

In step 245K, the kernel K executes the requested system call with parameters that are configured for the kernel K.

In step 246K, the kernel K sends a result from executing the requested system call to the kernel U.

Figure 3A:
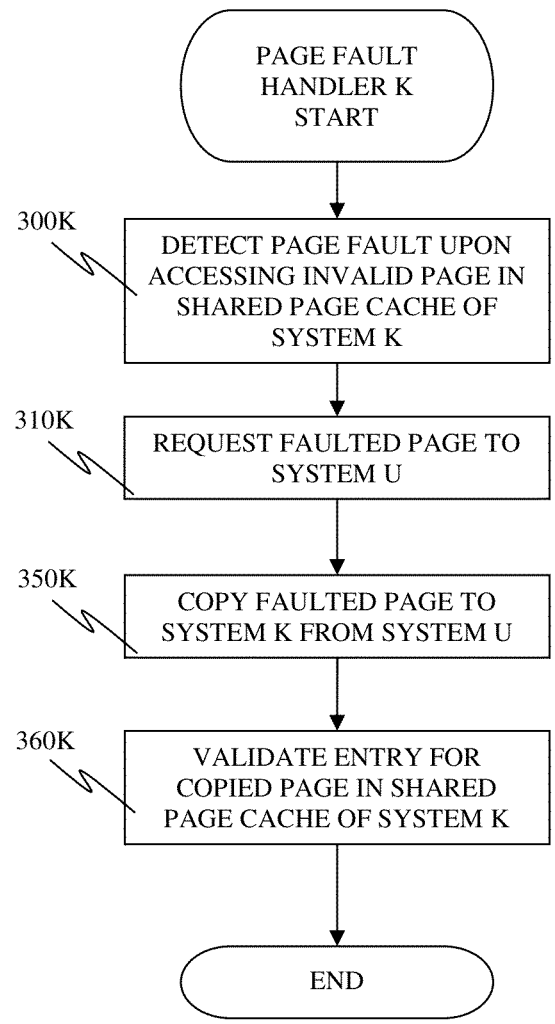
FIG. 3A is a flowchart depicting a method for handling a page fault by a page fault handler K utilizing a shared page cache in the hybrid system, in accordance with the embodiments of the present invention.
Figure 3B:
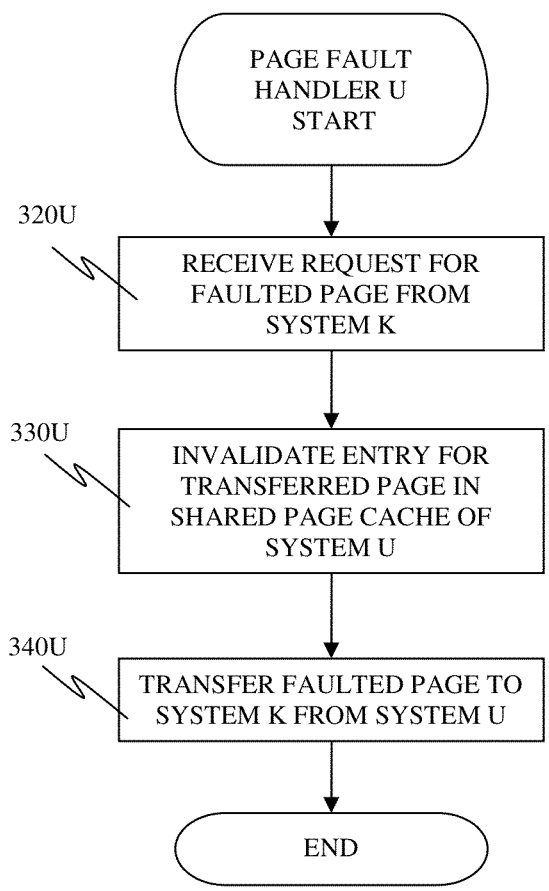
FIG. 3B is a flowchart depicting a method for handling a page fault by a page fault handler U utilizing a shared page cache in the hybrid system, in accordance with the embodiments of the present invention.

FIGS. 3A and 3B describe how a page fault is handled in the hybrid system.

The system K and the system U both have a respective page fault handler, the page fault handler K and the page fault handler U. The system K and the system U also have a respective copy of a shared page cache comprising entries associated with memory pages in each system. Memory pages available in one system are marked as valid entries in the shared page cache, and if a memory page is marked as valid in the shared page cache of one system, the same memory page in the other system is invalid, because only one system keeps the valid copy at a time. Also the page fault handler K and the page fault handler U coordinate validity flags of entries in the respective shared page cache such that the hybrid system can access valid memory pages regardless of the location of faulted pages.

The page fault handler K and the page fault handler U lock respective page entry in the respective shared page cache while handling the page fault, to assure one page entry in either the shared page cache of the system K or the shared page cache of the system U must be valid.

In this specification, the page fault occurs in the system K in step 243K of FIG. 2B, supra. Because memory pages are not necessarily copied to the system K while converting parameters of the system call in step 230U of FIG. 2A, supra, the kernel U keeps memory pages that are referred to by the parameters. The page fault handler U handles the page fault in step 244U of FIG. 2A, supra, in concert with the page fault handler K. Steps in FIGS. 3A and 3B are performed in an order of 300K, 310K, 320U, 330U, 340U, 350K, and 360K.

FIG. 3A is a flowchart depicting a method for handling a page fault by a page fault handler K utilizing a shared page cache in the hybrid system, in accordance with the embodiments of the present invention.

In step 300K, the kernel K detects a page fault upon accessing a page that is marked as invalid in a shared page cache in the system K. The kernel K proceeds with step 310K.

In step 310K, the kernel K requests the faulted page to the page fault handler U in the system U. The kernel K proceeds with step 350K.

In step 350K, the kernel K copies the faulted page to the system K as the faulted page is transferred from the system U in step 340U of FIG. 3B, infra.

In step 360K, the kernel K validates an entry in the shared page cache that corresponds to the copied page in step 350K supra such that the page is available for executing the system call in the system K.

FIG. 3B is a flowchart depicting a method for handling a page fault by a page fault handler U utilizing a shared page cache in the hybrid system, in accordance with the embodiments of the present invention.

In step 320U, the kernel U receives a request for the faulted page from the kernel K performing step 310K of FIG. 3A, supra. The kernel U proceeds with step 330U.

In step 330U, the kernel U invalidates an entry in the shared page cache that corresponds to the page that will be transferred in step 340U infra such that the kernel U does not access the transferred page any more because the page is used to execute the system call in the system K. The kernel U proceeds with step 340U.

In step 340U, the kernel U transfers the faulted page that had been requested in step 320U to the system K.

An example of a system call with memory reference may be, inter alia, write( ). A write( ) system call has three parameters representing a file descriptor that is an integer, a buffer area that is a pointer to a starting address of a memory area to write, and a length of the buffer area that is an integer representing the size of the buffer area to write. The system call number of the write( ) system call is converted to match the write( ) system call number on the system K. With the shared page cache of the present invention, the data in the buffer area is not copied initially but only the parameter pointing to the buffer area is adjusted to point a corresponding data area in the system K. Later on, if the buffer area is accessed while executing the write( ) system call in the system K, a page fault occurs for the data in the buffer area of the system U and the data is copied to the system K and the shared page caches in both systems are updated to reflect a status of the page holding the data in the buffer area.

In another embodiment of the present invention, the shared page caches of the system K and the system U may use a different cache/memory coherency protocol that utilizes four statuses of Modified, Exclusive, Shared or Invalid, which is referred to as the MESI protocol, instead of utilizing two statuses indicating only the validity as described in FIGS. 3A and 3B.

Figure 4:
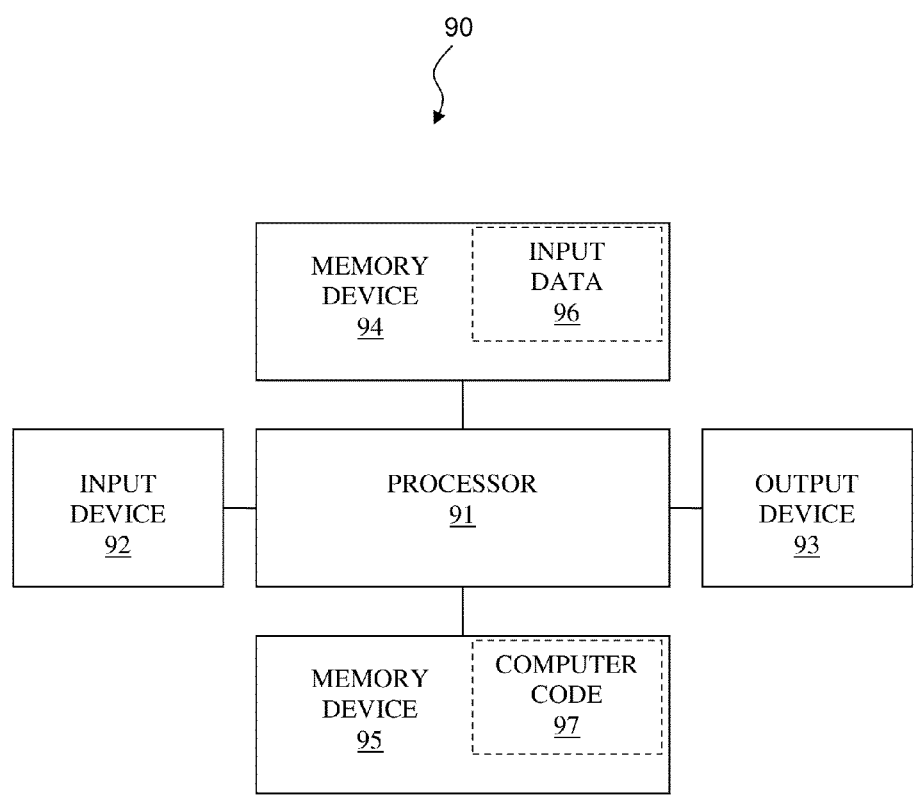
FIG. 4 illustrates a computer system used for handling a cross-platform system call with a shared page cache in the hybrid system, in accordance with embodiments of the present invention.

FIG. 4 illustrates a computer system 90 used for handling a cross-platform system call with a shared page cache in the hybrid system, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for handling a cross-platform system call with a shared page cache in the hybrid system according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for handling a page fault while executing a cross-platform system call with a shared page cache in a hybrid system that comprises at least one processor, said method comprising:

said at least one processor sending, by a first kernel running in a first computer system of the hybrid system to a second kernel running in a second computer system of the hybrid system, a system call comprising a parameter referring to a memory page of raw data, said memory page denoted by a first validity flag to be currently available to the first computer system in a first copy of the shared page cache in the first computer system and denoted by a second validity flag to be currently unavailable to the second computer system in a second copy of the shared page cache in the second computer system, said system call being sent from the first kernel to the second kernel with the parameter and without the memory page, wherein a result from execution of the system call depends on the raw data in the memory page;

after said sending the system call to the second kernel, said at least one processor receiving, by the first kernel from the second kernel, a request for the memory page which had been determined by the second kernel to be a faulted memory page in the second computer system;

in response to the request for the memory page, said at least one processor: (i) transferring, by the first kernel, the memory page from the first copy of the shared page cache in the first computer system to the second kernel for insertion, by the second kernel, of the transferred memory page into the second copy of the shared page cache in the second computer system and for updating, by the second kernel, the second validity flag to denote that the memory page is currently available to the second computer system in the second copy of the shared page cache; and (ii) updating, by the first kernel, the first validity flag to denote that the memory page is currently unavailable to the first computer system in the first copy of the shared page cache; and after said transferring the memory page to the second kernel, said at least one processor receiving, by the first kernel from the second kernel, the result from the second kernel having executed the system call.

2. The method of claim 1, wherein the memory page cannot be concurrently available to the first computer system and the second computer system in the first copy and the second copy, respectively, of the shared page cache.

3. The method of claim 1, wherein the first computer system is configured to execute user application programs for both first computer system and the second computer system within the hybrid system, wherein the second computer system is configured to provide kernel services for both first computer system and the second computer system within the hybrid system.

4. The method of claim 1, said method further comprising:

said at least one processor receiving, by the second kernel, the system call sent by the first kernel and in response, determining by the second kernel from the second validity flag that the memory page is said faulted memory page in the second computer system and in response, sending by the second kernel to the first kernel the request for the memory page;

after said transferring the memory page to the second kernel, said at least one processor: (i) inserting, by the second kernel, the transferred memory page into the second copy of the shared page cache in the second computer system; (ii) updating, by the second kernel, the second validity flag to indicate that the memory page is currently available to the second computer system in the second copy of the shared page cache; and (iii) executing, by the second kernel, the system call to obtain the result, wherein said executing the system call comprises accessing the raw data in the memory page in the second copy of the shared page cache in the second computer system.

5. The method of claim 1, wherein the first kernel has a first page fault handler for handling the memory page as a faulted page, and wherein the second kernel has a second page fault handler, for handling the memory page as a faulted page.

6. The method of claim 1, said method further comprising:
prior to said sending the system call to the second kernel, said at least one processor receiving, by the first kernel, the system call from a user application, wherein the system call received by the first kernel requests a result;
after said receiving the result from the second kernel, said at least one processor returning, by the first kernel, the result to the user application.

7. A computer program product, comprising a computer usable storage device having a computer readable program code embodied therein, said computer readable program code containing instructions that when executed by at least one processor of a hybrid system implement a method for handling a page fault while executing a cross-platform system call with a shared page cache in the hybrid system, the method comprising:
said at least one processor sending, by a first kernel running in a first computer system of the hybrid system to a second kernel running in a second computer system of the hybrid system, a system call comprising a parameter referring to a memory page of raw data, said memory page denoted by a first validity flag to be currently available to the first computer system in a first copy of the shared page cache in the first computer system and denoted by a second validity flag to be currently unavailable to the second computer system in a second copy of the shared page cache in the second computer system, said system call being sent from the first kernel to the second kernel with the parameter and without the memory page, wherein a result from execution of the system call depends on the raw data in the memory page;
after said sending the system call to the second kernel, said at least one processor receiving, by the first kernel from the second kernel, a request for the memory page which had been determined by the second kernel to be a faulted memory page in the second computer system;
in response to the request for the memory page, said at least one processor: (i) transferring, by the first kernel, the memory page from the first copy of the shared page cache in the first computer system to the second kernel for insertion, by the second kernel, of the transferred memory page into the second copy of the shared page cache in the second computer system and for updating, by the second kernel, the second validity flag to denote that the memory page is currently available to the second computer system in the second copy of the shared page cache; and (ii) updating, by the first kernel, the first validity flag to denote that the memory page is currently unavailable to the first computer system in the first copy of the shared page cache; and
after said transferring the memory page to the second kernel, said at least one processor receiving, by the first kernel from the second kernel, the result from the second kernel having executed the system call.

8. The computer program product of claim 7, wherein the memory page cannot be concurrently available to the first computer system and the second computer system in the first copy and the second copy, respectively, of the shared page cache.

9. The computer program product of claim 7, wherein the first computer system is configured to execute user application programs for both first computer system and the second computer system within the hybrid system, wherein the second computer system is configured to provide kernel services for both first computer system and the second computer system within the hybrid system.

10. The computer program product of claim 7, said method further comprising:
said at least one processor receiving, by the second kernel, the system call sent by the first kernel and in response, determining by the second kernel from the second validity flag that the memory page is said faulted memory page in the second computer system and in response, sending by the second kernel to the first kernel the request for the memory page;
after said transferring the memory page to the second kernel, said at least one processor: (i) inserting, by the second kernel, the transferred memory page into the second copy of the shared page cache in the second computer system; (ii) updating, by the second kernel, the second validity flag to indicate that the memory page is currently available to the second computer system in the second copy of the shared page cache; and (iii) executing, by the second kernel, the system call to obtain the result, wherein said executing the system call comprises accessing the raw data in the memory page in the second copy of the shared page cache in the second computer system.

11. The computer program product of claim 7, wherein the first kernel has a first page fault handler for handling the memory page as a faulted page, and wherein the second kernel has a second page fault handler, for handling the memory page as a faulted page.

12. The computer program product of claim 7, said method further comprising:
prior to said sending the system call to the second kernel, said at least one processor receiving, by the first kernel, the system call from a user application, wherein the system call received by the first kernel requests a result;
after said receiving the result from the second kernel, said at least one processor returning, by the first kernel, the result to the user application.

13. A computing system comprising at least one processor and a computer readable memory unit coupled to the at least one processor, said memory unit containing instructions that when executed by the at least one processor implement a method for handling a page fault while executing a cross-platform system call with a shared page cache in a the hybrid system, said method comprising:
said at least one processor sending, by a first kernel running in a first computer system of the hybrid system to a second kernel running in a second computer system of the hybrid system, a system call comprising a parameter referring to a memory page of raw data, said memory page denoted by a first validity flag to be currently available to the first computer system in a first copy of the shared page cache in the first computer system and denoted by a second validity flag to be currently unavailable to the second computer system in a second copy of the shared page cache in the second computer system, said system call being sent from the first kernel to the second kernel with the parameter and without the memory page, wherein a result from execution of the system call depends on the raw data in the memory page;

after said sending the system call to the second kernel, said at least one processor receiving, by the first kernel from the second kernel, a request for the memory page which had been determined by the second kernel to be a faulted memory page in the second computer system;

in response to the request for the memory page, said at least one processor: (i) transferring, by the first kernel, the memory page from the first copy of the shared page cache in the first computer system to the second kernel for insertion, by the second kernel, of the transferred memory page into the second copy of the shared page cache in the second computer system and for updating, by the second kernel, the second validity flag to denote that the memory page is currently available to the second computer system in the second copy of the shared page cache; and (ii) updating, by the first kernel, the first validity flag to denote that the memory page is currently unavailable to the first computer system in the first copy of the shared page cache; and after said transferring the memory page to the second kernel, said at least one processor receiving, by the first kernel from the second kernel, the result from the second kernel having executed the system call.

14. The computing system of claim 13, wherein the memory page cannot be concurrently available to the first computer system and the second computer system in the first copy and the second copy, respectively, of the shared page cache.

15. The computing system of claim 13, wherein the first computer system is configured to execute user application programs for both first computer system and the second computer system within the hybrid system, wherein the second computer system is configured to provide kernel services for both first computer system and the second computer system within the hybrid system.

16. The computing system of claim 13, said method further comprising:

said at least one processor accessing, by the second kernel, a page marked as invalid in the second copy of the shared page cache in the second computer system;

said at least one processor receiving, by the second kernel, the system call sent by the first kernel and in response, determining by the second kernel from the second validity flag that the memory page is said faulted memory page in the second computer system and in response, sending by the second kernel to the first kernel the request for the memory page;

after said transferring the memory page to the second kernel, said at least one processor: (i) inserting, by the second kernel, the transferred memory page into the second copy of the shared page cache in the second computer system; (ii) updating, by the second kernel, the second validity flag to indicate that the memory page is currently available to the second computer system in the second copy of the shared page cache; and (iii) executing, by the second kernel, the system call to obtain the result, wherein said executing the system call comprises accessing the raw data in the memory page in the second copy of the shared page cache in the second computer system.

17. The computing system of claim 13, wherein the first kernel has a first page fault handler for handling the memory page as a faulted page, and wherein the second kernel has a second page fault handler, for handling the memory page as a faulted page.

18. The computing system of claim 13, said method further comprising:

prior to said sending the system call to the second kernel, said at least one processor receiving, by the first kernel, the system call from a user application, wherein the system call received by the first kernel requests a result;

after said receiving the result from the second kernel, said at least one processor returning, by the first kernel, the result to the user application.

\* \* \* \* \*